United States Patent
Arpee et al.

(10) Patent No.: US 6,606,494 B1
(45) Date of Patent: Aug. 12, 2003

(54) APPARATUS AND METHOD FOR NON-DISRUPTIVE COLLECTION AND ANALYSIS OF WIRELESS SIGNAL PROPAGATION

(75) Inventors: John Arpee, Herndon, VA (US); Stan Gutowski, Arlington, VA (US); Mustafa Touati, Herndon, VA (US)

(73) Assignee: ScoreBoard, Inc., Herndon, VA (US)

( * ) Notice: Subject to any disclaimer, the term of this patent is extended or adjusted under 35 U.S.C. 154(b) by 0 days.

(21) Appl. No.: 09/567,709

(22) Filed: May 10, 2000

(51) Int. Cl.[7] ................................................. H04Q 7/20
(52) U.S. Cl. ....................... 455/422; 455/446; 455/421; 455/423; 455/424; 455/67.1; 455/67.3
(58) Field of Search ................................ 455/421–424, 455/67.1, 67.3, 446, 440, 456–457

(56) References Cited

U.S. PATENT DOCUMENTS

| | | | |
|---|---|---|---|
| 5,321,613 A | * 6/1994 | Porter et al. ................ 702/1 |
| 5,423,067 A | * 6/1995 | Manabe ..................... 455/524 |
| 5,465,390 A | 11/1995 | Cohen |
| 5,987,306 A | 11/1999 | Nilsen et al. |
| 5,987,328 A | * 11/1999 | Ephremides et al. ........ 455/446 |
| 6,041,236 A | 3/2000 | Bernardin et al. |
| 6,131,069 A | * 10/2000 | Bottinger .................... 702/5 |
| 6,336,035 B1 | * 1/2002 | Somoza et al. .............. 455/446 |
| 6,516,195 B1 | * 2/2003 | Zadeh et al. ................ 455/446 |
| 6,522,888 B1 | * 2/2003 | Garceran et al. .......... 455/456.3 |

OTHER PUBLICATIONS

ETL 1110–1–175 (Jun. 30, 1997) "Engineering and Design—Practical Aspects of Applying Geostatistics at Hazardous, Toxic and Radioactive Waste Sites"; Chapter 2 entitled "Technical Aspects of Geostatistics"; pp. 2–1 to 2–17.

* cited by examiner

*Primary Examiner*—William Trost
*Assistant Examiner*—Marcos Torres
(74) *Attorney, Agent, or Firm*—Zito tlp; Joseph J. Zito

(57) ABSTRACT

A data collection and evaluation method for determination of wireless signal propagation from an incomplete set of measured data. The present invention decodes digital identification information on the channel used to associate the measurement with a wireless antenna and/or sector. The decoding process is limited by interference and low signal levels, therefore, the resulting data will have locations or entire areas where digital identification codes cannot be determined and the signal origination antenna cannot be identified. The present invention introduces geostatistical data interpretation techniques to determine the signal level values at the missing measurement locations. The present invention can obtain a more complete set of data for all sectors in the data collection area, allowing for more accurate performance evaluation and greater planning information. The present invention teaches the application of variogram modeling and kriging for wireless signal propagation modeling.

22 Claims, 8 Drawing Sheets

APPARATUS AND METHOD FOR NON-DISRUPTIVE COLLECTION AND ANALYSIS OF WIRELESS SIGNAL PROPAGATION

BACKGROUND OF THE INVENTION

The present invention relates to cellular telephone systems and to modeling cellular telephone systems for optimizing utilization of the available overall radio spectrum. More particularly, the present invention relates to a reliable performance prediction based upon a measurement technique for unobtrusive gathering of data about the performance of the cellular system without interruption of normal operation and for complex analysis of the gathered data.

The service area of a wireless communications system is partitioned into connected service domains known as cells, where radio telephone (cellular) users communicate, via radio links, with the base station serving the cell. The cells can be further partitioned into segments. The base station is coupled to the land line network.

Presently available commercial mobile communication systems typically include a plurality of fixed cells each of which transmits signals to and receives signals from mobile units within its communication area. In AMPS or FDMA systems, each base station is assigned a plurality of channels (each 30 KHz wide) within a frequency spectrum over which it can communicate with mobile units. A mobile unit within range of the base station communicates with the base station using these channels. Typically, the channels used by a base station are separated from one another in some manner (typically skipping 1, 7 or 21 intermediate channels) sufficiently that signals on any channel do not interfere with signals on another channel used by that base station. To accomplish this, an operator typically allots to a base station a group of channels each of which is widely separated from the next. So long as a mobile unit is within the area in which the signal from a base station is strong enough and is communicating with only that base station, there is no interference with the communication. The present invention will also operate with GSM and iDEN systems which do not rely on the same frequency divisions multiple access method.

In a common type of mobile system called Time Division Multiple Access (TDMA), which includes IS-54 and IS-136, GSM and iDEN each frequency channel is further time divided into additional channels within each frequency. Each base station sends and receives in bursts during some number of different intervals or time slots. These time intervals within frequency bands then effectively constitute the individual channels. In order to distinguish the channel divisions within a frequency and to distinguish channels of a common frequency between overlapping cells digital codes are used. For example, IS-136 utilizes Digital Verification Color Codes unique to a channel at a cell, are used. GSM uses Base Station identification codes.

In order to allow mobile units to transmit and receive telephone communications as the units travel over a wide geographic area, each cell is normally physically positioned so that its area of coverage is adjacent to and overlaps the areas of coverage of a number of other cells. When a mobile unit moves from an area covered by one base station to an area covered by another base station, communications with the mobile unit are transferred (handed off) from one base station to another in an area where the coverage from the adjoining cells overlaps. Because of this overlapping coverage, the channels allotted to the individual cells are carefully selected so that adjoining cells do not transmit or receive on the same channels. This separation is typically accomplished by assigning a group of widely separated non-interfering channels to some central cell and then assigning other groups of widely separated non-interfering channels to the cells surrounding that central cell using a pattern which does not reuse the same channels for the cells surrounding the central cell. The pattern of channel assignments continues similarly with the other cells adjoining the first group of cells. Often adjacent or overlapping cells will transmit on the same frequency and both will be received by a mobile wireless unit. However, because of the digital codes identifying each channel, the mobile wireless unit can process the appropriate signal and ignore any additional reception.

It is desirable to provide a process by which interference between cellular telephone system channels operating at the same frequency and/or adjacent frequencies may be accurately predicted over each entire cell of an entire system based upon dynamic information corresponding to in-use performance and for adaptively reallocating channels based upon the in-use interference performance to maximize capacity while minimizing overall interference within the system.

SUMMARY OF THE INVENTION

The performance, in terms of service evaluation quality, is the goal of the collection and analysis taught herein. The drive testing measures RF propagation of a cellular system. Performance quality is determined by the analysis of the measured test drive data. Drive testing is used to aid in evaluation of the system, to determine cell placement and channel distribution and to evaluate sector interference. A cellular service area is analyzed and a drive route is established. Determination of a proper and effective drive route is essential for proper system evaluation. The drive route is based on a complex analysis of the system, including its electronic and geographic features. Once a drive route is established, one or more vehicles are driven through the cellular system to collect data. The vehicles are provided with radio receivers for detecting the signal strength from the cell sites and with positioning equipment such as GPS receivers to determine the location corresponding to a received signal. The vehicle are also equipped with data collection equipment, such as computers for collection and correlation of the data.

The measurement system is typically installed in a vehicle. Data is collected as the vehicle travels a predetermined route within the service area. The measurement system can also be used to collect data within a building, although this requires a different mechanism for providing the positioning information. The typical measurement system consists of a scanning receiver, GPS, and laptop computer. The scanning receiver produces signal level measurements for a predetermined list of channels while the GPS provides positioning (latitude/longitude) information. The laptop computer logs the signal level and positioning information during the measurement event.

A scanning receiver tuned to a particular frequency, cannot distinguish between separate signals on that same frequency and therefore does not have the ability to determine if a signal originates from one or more than one cell antenna in an AMPS/FDDMA system. Because of the overlap of signals when all of the cell sites are active, the test vehicles cannot accurately determine a signal level from a given antenna location. A received signal level may be the combination of signals from more than one base station. In order to avoid this problem when drive testing an AMPS system, individual antennas on each sector are keyed-up to a constantly transmitting state on a single particular frequency distinct from all of the other sectors. This is commonly referred to as a keyed-up or beacon signal. By tuning to a particular frequency, a receiver in a test vehicle can accurately determine the base station corresponding to the received signal and can determine the signal level from that single sector.

In key up testing, a unique test channel is established on each sector that propagates into a measurement area. By establishing a unique test channel on a sector, measurements for the given channel can be positively associated to the source sector. This methodology for establishing the unique test channel requires modifications to the system. The test channel is placed in a mode such that it transmits a constant signal, which is referred to as a "key-up". In addition, the same channel (and sometimes adjacent channels) is turned off ("blocked") on all other sectors that propagate into the measurement area. The process of keying-up and blocking channels requires that many channels be removed from service to perform this measurement collection. Therefore, the measurement collection is limited to periods when there are few mobiles operating in the system, typically 10 pm to 5 am.

If the number of sectors that propagate into a measurement area is greater than the number of key-up channels available, a series of overlapping drives are performed. In this situation, a subset of sectors are assigned key-up channels while the measurements are performed in an area. The area is then re-driven with a different subset of sectors assigned key-up channels. This process is repeated until measurements have been obtained for each sector that propagates into the measurement area.

The goal of collecting measured data is to obtain a complete set of measurements at each location. Complete means that a measurement was achieved for each sector, or it was determined that the sector is below a signal level that can be detected by the scanning receiver.

In TDMA systems IS-54 and IS-136, GSM and iDEN, the signal contains a digital information component identifying the transmitting antenna of a particular signal on a common frequency. It is not necessary to key-up base stations in order to distinguish cell site locations. A drive test can be performed during normal operation of the wireless system. The receiving equipment in the drive test vehicles can determine the transmitting sector based on the Digital Verification Color Code, DVCC, assigned to each sector. The wireless signal for data collection can be acquired by using test equipment designed for TDMA systems, such as the E747A TDMA Drive-Test System from Agilent Technologies and the SeeGull Scanning Receiver from Dynamic Telecommunications. The scanning receivers must be combined with control and positioning equipment as well as data collection and management elements.

The scanning receiver is capable of performing measurements and decoding a "color code" transmitted on a digital channel. The color code is a digital signature incorporated in information transmitted by the channel. By associating the channel and color code combination detected by the receiver to the combinations known to exist on a sector, the measured signal level can be associated to a particular sector. This assumes that each combination of channel and color code provides a unique identifier, which can be made possible with few modifications to the system.

The ability to decode the color code on a channel is affected by low signal levels and interference. The probability of decoding the color code diminishes due to these factors. Therefore the measurement system may not be capable of decoding a color code at some locations. The resulting data is incomplete due to gaps in the measurements for affected sectors.

In some systems, it is possible to increase the probability of obtaining a color code by attempting rapid decodes on every channel used on a sector. In particular, when the decode is affected by interference, it may be possible to obtain a decode on a channel not receiving interference. There are three likely situations when this could occur:

First, if the interfering signal transitions into momentary fade this may allow an opportunity for reduction of the interference and to decode the signal on the monitored channel.

Second, the combination of channels used in the monitored sector may be different than the channels used on the interfering sector, providing at least one channel not common to the monitored sector and the interfering sector and thus a channel that is not receiving interference.

Third, when channels become inactive when not carrying traffic, it is possible to obtain a non-interference opportunity on at least one channel of a the monitored sector.

These techniques can significantly reduce, but not eliminate, the gaps in the measurement data.

Even with TDMA, DVCC information obtained by drive testing can be incomplete and/or inaccurate. For example, if all of the sectors and channels of a particular site are assigned, the receiving equipment could measure raw RF power, however, it may not be possible for the test equipment to identify a signal at a given location. Momentary systems anomalies can also create drop spots or holes in reception during drive testing, thereby interfering with the collection of signal level measurements on a cellular system utilizing a measurement system. Certain physical conditions, such a bridges and/or tunnels, can create reception anomalies and or increased interference, thereby effecting the normalization of data. Also, the reliability factor of signal measurement, taught herein as an error rate, can cause assignment of varying analysis weight to certain collected data.

The present invention teaches the implementation of data collection weighting and geostatistical analysis techniques in the evaluation of collected drive data. Originally found in the field of mining and petroleum exploration the present invention teaches the application of geostatistical techniques to interpret sparse measurements. The present invention recognizes the applicability of these techniques to the evaluation of drive test data and teaches the method for application of geostatistical analysis to a geospatial region of a cellular system drive test. These robust techniques, when applied as herein taught, are capable of interpolating information for locations where measurements are not available. The process considers the directional correlation of the data to provide an unbiased estimate. In particular, the use of Kriging honors the variable nature of the data in a geospatial relationship.

The applicability of geostatistics to geological exploration can be found for example in U.S. Pat. No. 5,729,451 to Gibbs, et al. Gibbs teaches a data fusion workstation apparatus and method which utilizes algorithms and can be used for applications such as, e.g., hydrogeological modeling, steady-state hydrological flow modeling, transport uncertainty determination, flow/transport fusion, oil reserve management, water supply development and geo-technical engineering projects.

The use of geostatistical techniques, as taught herein, allow the gaps in the measurement data to be interpolated, therefore resulting in a complete set of measurements at each location. In addition, it is possible to interpolate values in areas where measurements where not attempted. For example, it is typically not feasible to obtain measurements for every street in a cellular network. These methods would allow values to be interpolated for streets not measured, and for locations between roads.

Besides actual measurement values, there is information that can be used to provide a more accurate interpolation. The interpolation algorithms can utilize modeled propagation values as secondary information to bolster the estimation. Also, in cases where it may not be possible to associate a measurement to a particular sector (due to inability to decode a color code), the measurement information can still be used to determine an upper bound of the signal level that would be present at a location.

For example, control channels (and key-up channels) transmit a continuous signal. When a measurement is obtained on these channels, it is assured that the signal level received by any sector using that channel in such a mode is below the value measured. This upper bound information can be incorporated in providing a more accurate estimate.

These and other features of the invention will be better understood by reference to the detailed description which follows taken together with the drawings in which like elements are referred to by like designations throughout the several views.

DETAILED DESCRIPTION OF EXEMPLARY EMBODIMENTS

Figure 1:
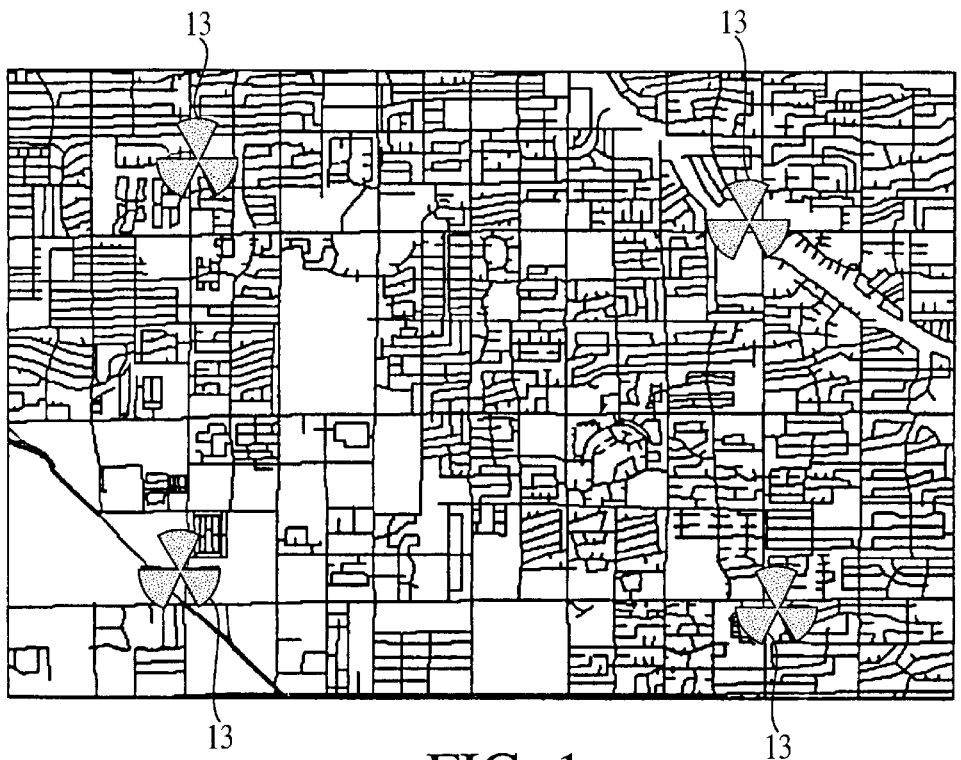
FIG. 1 is an exemplary map of a portion of a cellular telephone system.
Figure 3:
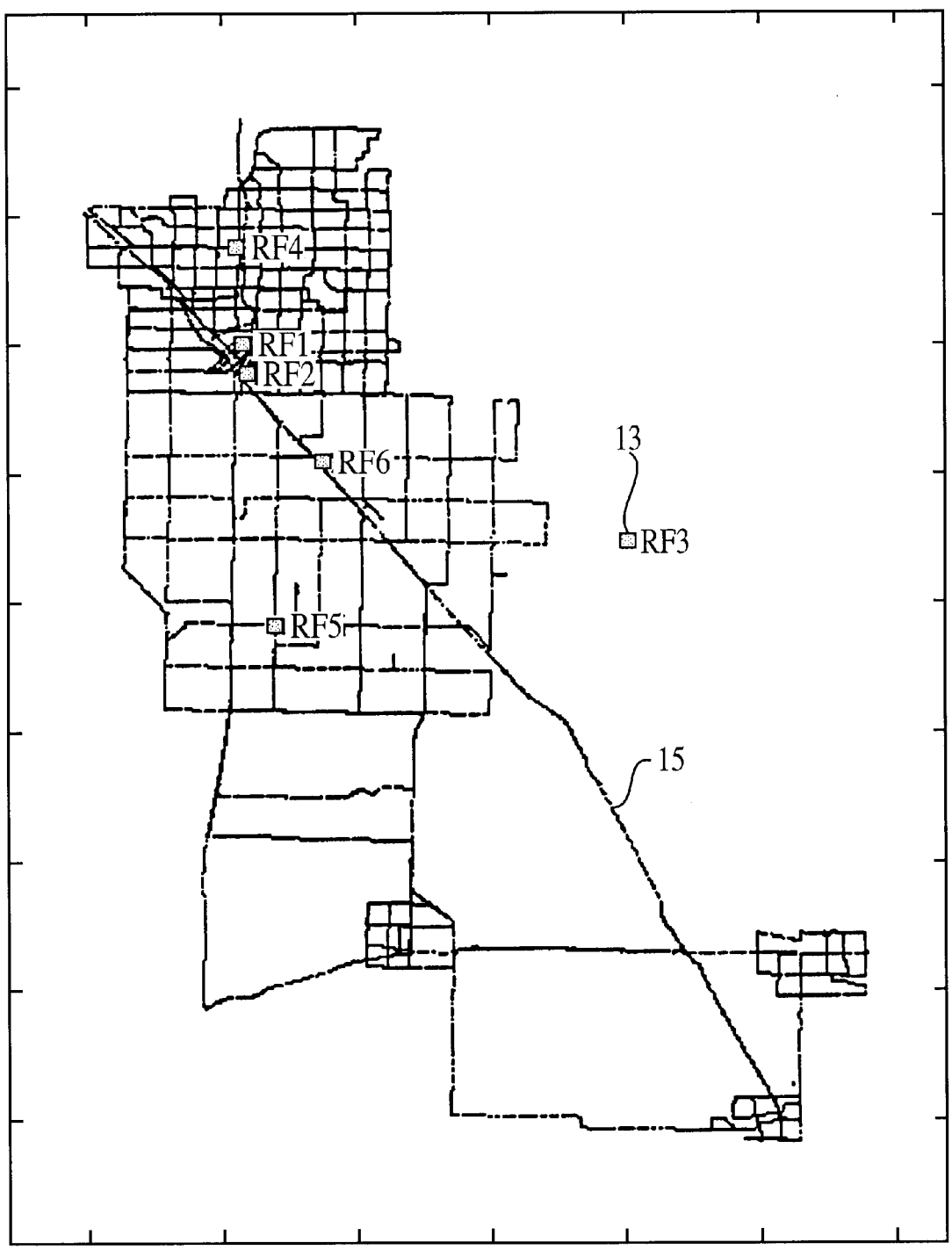
FIG. 3 is an exemplary map of an area illustrating the location of six cell sites and an exemplary drive map plan for evaluation of the sites.

FIGS. 1 and 3 illustrate exemplary street maps of portions of exemplary cellular systems. The maps of FIGS. 1 and 3 also illustrates the locations of a plurality of exemplary cell sites with base stations 13. The site may be divided into three or more segments by use of directional antennae. The sites could be divided into any number of segments including a single segment per cell, three segments are illustrated in FIG. 1 only for the sake of example. The system may have additional not illustrated cells 13 which overlap to provide effective coverage in the region of the cellular system illustrated in FIGS. 1 and/or 3.

Figure 2:
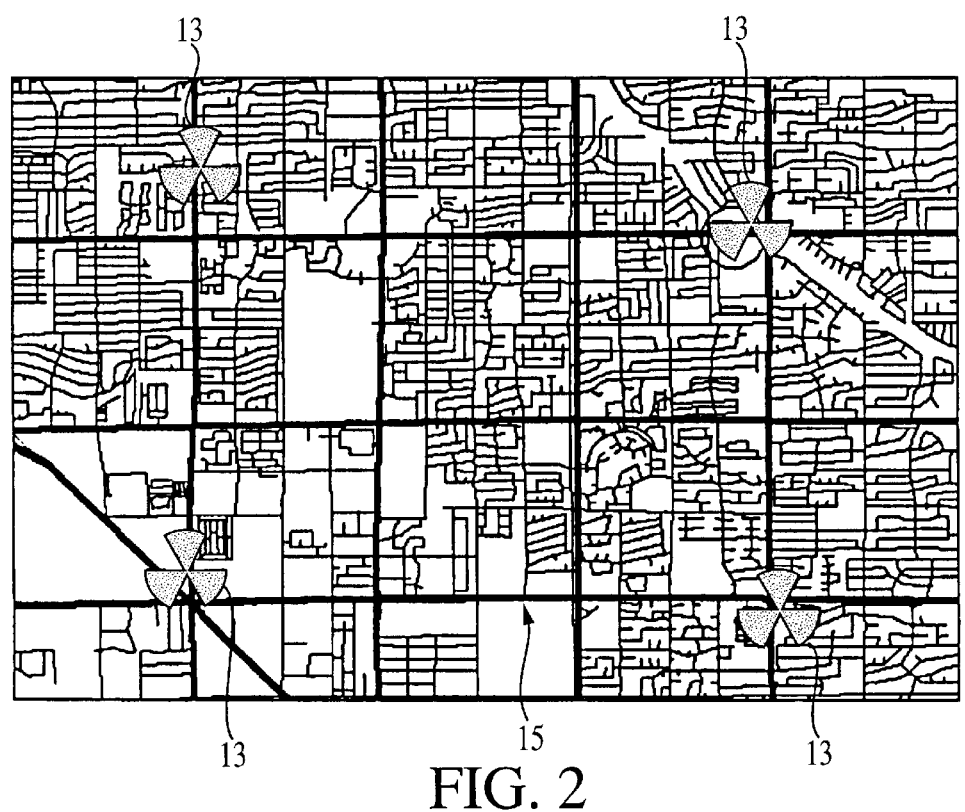
FIG. 2 is an exemplary drive test planning map projected on the cellular telephone system of FIG. 1.

FIG. 2 illustrates an exemplary drive test route plan 15 overlayed on the cellular system illustrated in FIG. 1. FIG. 3 illustrates a drive test plan for the system of cell sites RF1 through RF6. The drive plan 15 is a carefully determined route which will provide maximum efficient coverage of the cellular system. The drive plan 15 is established by evaluation of the distribution of the antennae 13 of the cellular system and through analysis of the geographical features of the area of the cellular system. The drive test planning criteria are more fully described in co-pending applications of the common assignee.

Figure 4:
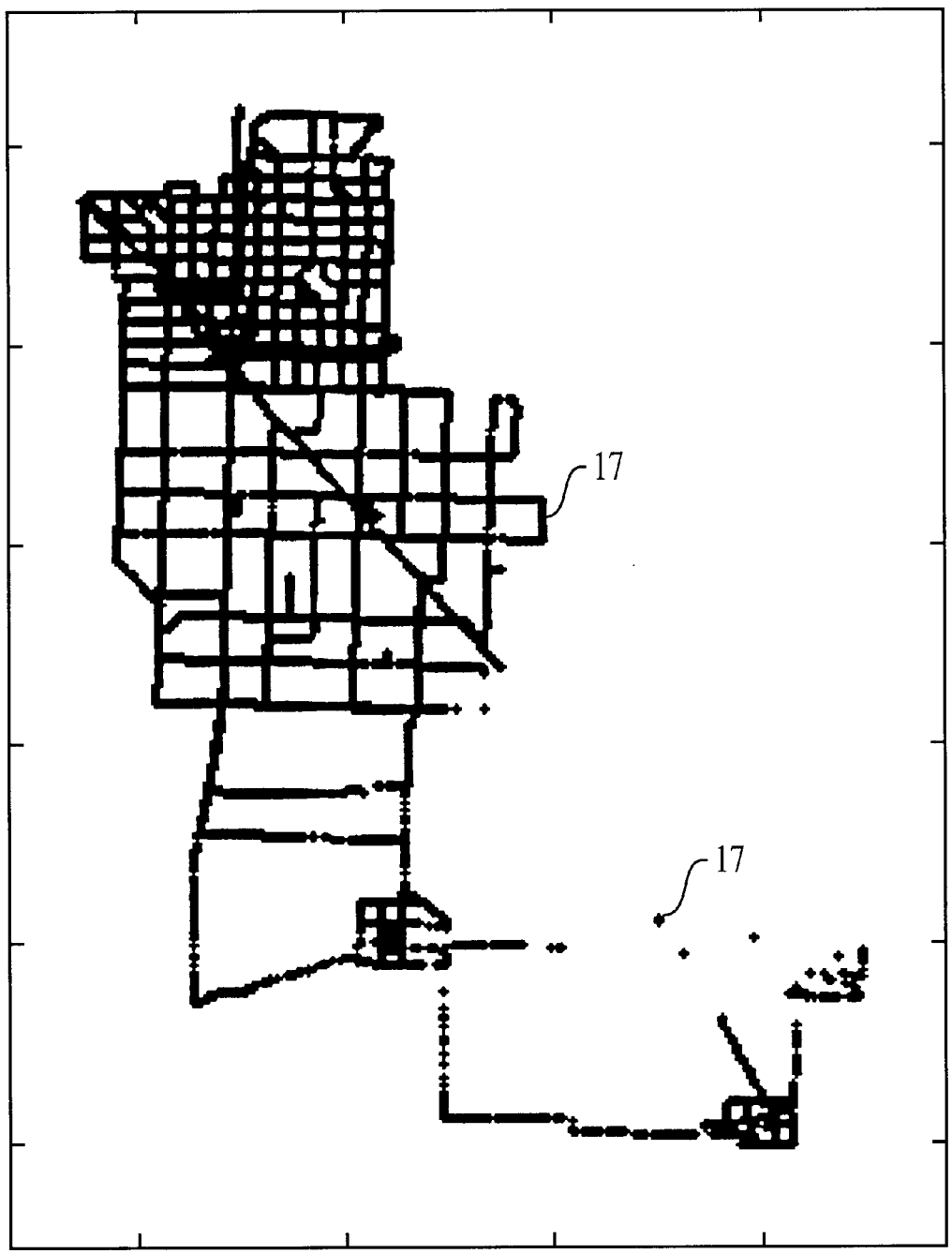
FIG. 4 is a graphical view illustrating exemplary raw RF signal strength data obtained in an exemplary drive test for FIG. 3.
Figure 5:
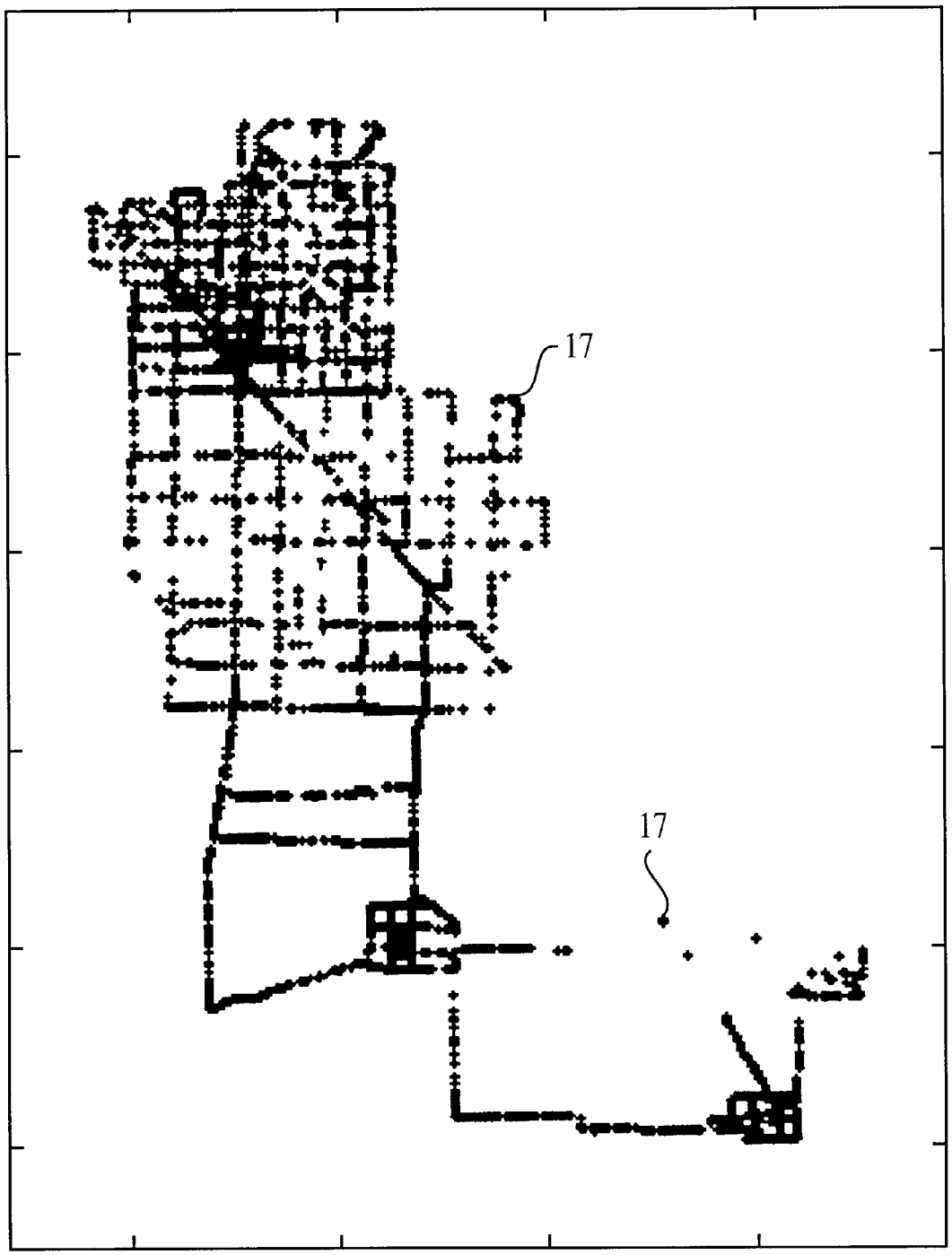
FIG. 5 is a graphical view illustrating exemplary successfully decoded digital code signals data obtained in an exemplary drive test for FIG. 3.

As detailed in copending applications, a vehicle equipped with appropriate cellular signal receiving and measuring equipment is driven through the cellular system in accordance with the drive test plan map to collect actual signal reception data. A statistically significant number of measurements 17 are taken throughout the cellular system as illustrated in FIGS. 4 and 5 to determine the relative signal strength between each base station 13 and each mobile unit location. The path loss of the signal is measured in dB. As the strength of the received signal decreases, it has a greater path loss or signal loss which is recorded as greater positive dB number. For example, in FIG. 8, the path loss measured at location 19 is between +94 and +114 dB (a signal path loss drop of at least 94 dB from the original signal strength at the antenna). The path loss at location 21, which is farther from the antenna RF1, is measured between +154 and +174 dB (a signal loss drop of at least 154 dB from the original signal strength at the antenna). The greater the positive number, the lower the signal strength at the measurement location. Area 23 is between 114 and 134 and area 25 is between 134 and 154.

A drive test cannot cover all of the area of a cellular system. Total drive coverage is both impractical and impossible. It is impractical because of the time and resource limitations in drive testing. It is impossible because some parts of a cellular system are inaccessible due to natural and man made obstacles. The data obtained by the drive test process is also incomplete even in the areas tested because of the inherent imperfections of actual measurement conditions, even if parts of the drive plan are driven multiple times. In most instances, if portions of the drive plan are driven more than once, repetition of a portion of a drive plan will accumulate differing results for the same mobile locations. These differences must be weighted and accounted.

Because cellular planning decisions including site location and channel interference is currently determined based upon this imperfect data set, a reliable and robust method for interpretation of the drive test results must be used. The present invention teaches the techniques to be applied to drive test results to make the best determination from available data to estimate needed parameters. Because the distribution of RF signal and channel allocation is complex, even a large data set may not prove sufficient to resolve accurately the actual distribution properties that determine the cellular service quality performance. It is important that an analysis of the data collected during drive testing be performed to fill in the gaps in a manner which is both accurate and robust. The algorithm for resolving the data into a complete usable data set must also account for the error estimate of particular elements of the data set.

Geostatistical analysis techniques offer a way of describing the spatial continuity that is an essential feature of many natural phenomenon and provide adaptations of classical regression techniques to take advantage of this continuity. In geostatistics, the application of highly developed algorithms modified to the parameters of the provision of cellular service, as taught in the present invention yields significantly enhanced results over other data smoothing techniques.

The application of geostatistical techniques to the analysis of cellular system drive test data is a multi-part process. The process includes the following elements for interpretation of the collected data: binning, merging and kriging:

First the data is gathered through a drive test method. In a key-up method of data collection, FIG. 4, the measured data will be raw RF power on a given frequency as measured at a particular location. This form of raw RF power collection will yield a number of RF power readings corresponding to the location of the power reading. As illustrated in FIG. 4, measurement of RF power yields an almost continuous set of data because RF power will be detected even if the signal strength is weak or has interference.

When measuring RF power on a given frequency, a test drive will yield results at almost all locations because the receiver will almost always receive a signal reading, down to the signal level threshold of detectable by the scanning receiver. Therefore there will be few actual measurement gaps in the set of data collected during a drive test.

With the no-key up method of the present invention, FIG. 5, the collection equipment must not only determine signal strength but must also decode the digital code associated with the signal which identifies the digital channel and/or sending antenna. Accurately decoding a digital signal is more difficult than reception of raw RF and requires a stronger and/or clearer signal reception. The inability to decode a digital code due to signal strength, interference or other factors can lead to significant gaps in the data collection, as illustrated in FIG. 5. The existence of gaps in the collected data gives rise to the need for the statistical interpretation of the data as taught in the present invention to fill in the gaps.

Figure 6:
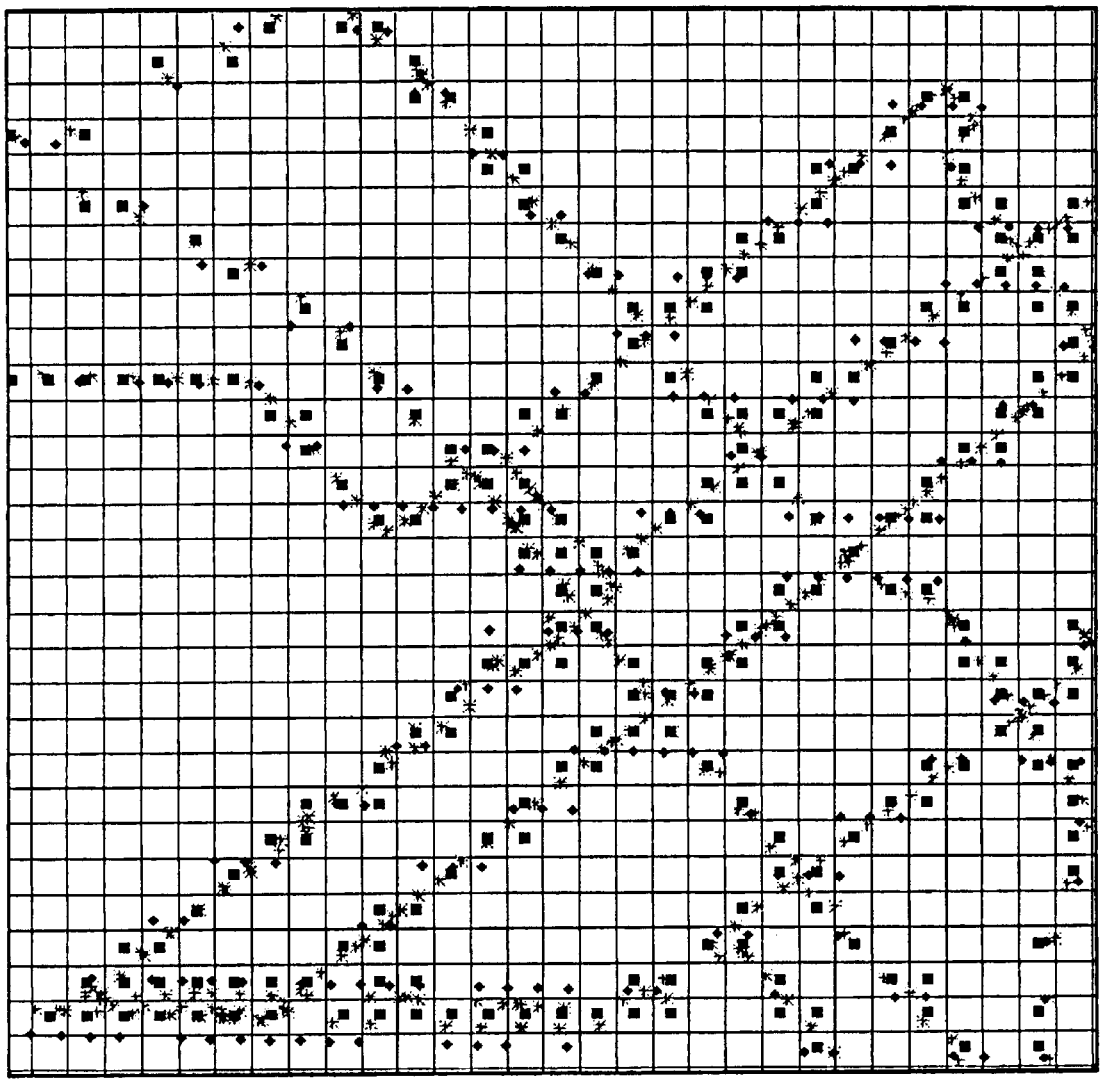
FIG. 6 illustrates the application of a bin grid to the test area.

The measurement area is divided by a grid, FIG. 6, into bins of a predetermined geographic area. The data collected, FIG. 5, is grouped into bins of physically close data locations. All of the data points which lie within a single grid square or bin are averaged to determine a single value for each grid. This averaging of the data reduces distortions which could result from a greater number of measurements in some areas and a lesser concentration of measurements in other areas. When conducting a drive test sampling is performed at a constant rate, however, the rate of travel of the sampling vehicle may vary and therefore a greater number of samples will be obtained in an area where the vehicle is traveling more slowly. Certain areas may be sampled at a greater density due to slow traffic or other factors and other areas may be sampled less densely due to fast traffic, bad reception or other factors.

After collection and averaging of the data by bins, the data is analyzed to fill in the missing data points with accurate estimations. In order to accurately apply geostatistical analysis techniques, such as Kriging, an evaluation of the data to determine the variance of data based upon the separation of the data points must be performed and a correlation of the variance based upon the size of the separation must be determined. This analysis is referred to as the development of a variogram for the data set.

By applying the teachings of the present invention it is possible to use a DVCC data sampling and obtain reliable results. The kriging model should account for the trend (path loss decay) in the variogram computation and modeling. RF propagation exhibits non-stationary (trend) properties which are accommodated in the analysis model taught herein.

A generalized data analysis workflow according to the present invention includes: variogram analysis: trend, short scale, omnidirectional, anisotropy (directional correlation in data); variogram modeling; kriging interpolation; Post Analysis: histograms and cross-plots.

Development of an appropriate variogram requires a spatial continuity model. The purpose of spatial continuity analysis is to quantify the variability of Path Loss measurements with respect to distance and direction. Geographic location is considered when the data exhibit a directional correlation, a property known as anisotropy.

Quantifying the spatial information involves comparing data values measured at one location with values of the same attribute measured at other locations. For example, two path loss measurements in close proximity are more likely to have similar values than two path loss measurements further apart. By determining the correlation with respect to separation distance, estimates of the unmeasured locations can be made based upon the values at the measured locations.

For each azimuth and lag (separation) distance studied, all measured values can be spatially correlated and expressed as a statistical value known as the variogram, and is calculated using the following expression:

$$\gamma_{(h)} = \frac{\Sigma[Z_{(xi)} - Z_{(xi+h)}]^2}{2n}$$

where:

$Z_{(xi)}$=the sample location at xi $Z_{(xi+h)}$=the sample location at xi+the lag distance, h n=the number of data pairs The variogram $\gamma_{(h)}$ term is a measure of dissimilarity, or increasing variance as a function of distance. The variogram is the sum of the squared differences of all data pairs falling within a lag divided by twice the number of pairs found for that lag. Computing and plotting $\gamma_{(h)}$ as a function of increasing lag distance, h, results in a plot of the experimental variogram, FIG. 7.

Figure 7:
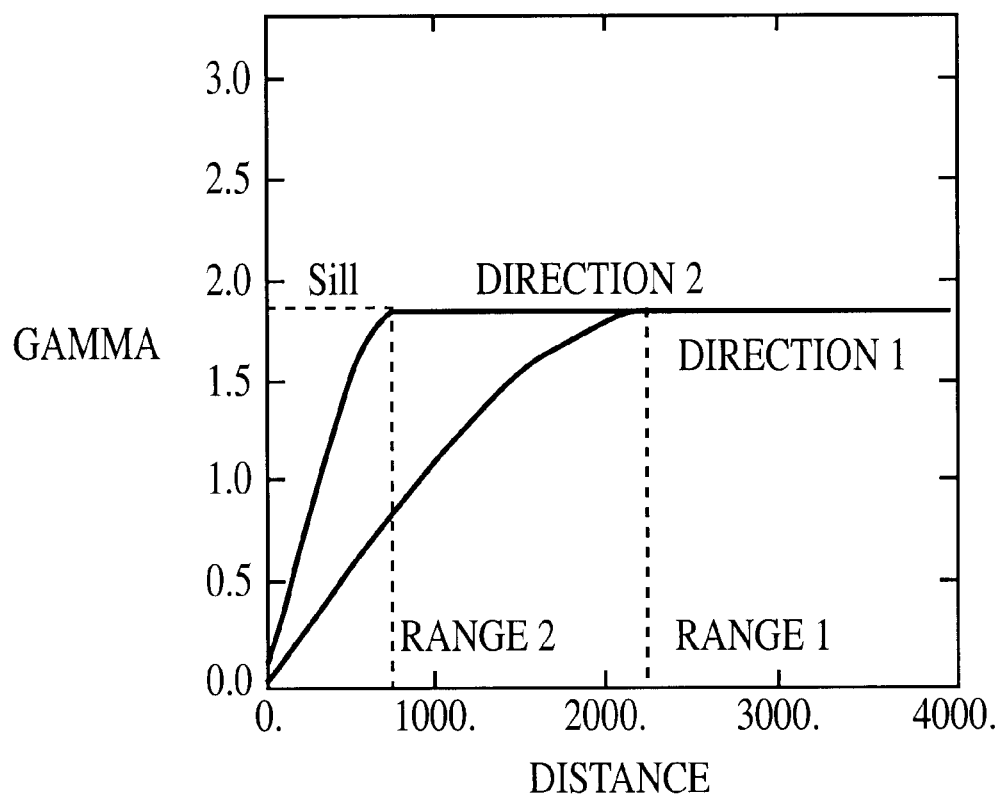
FIG. 7 is a variogram illustrating decreasing correlation with distance to a sill.

With increasing distance, $\gamma_{(h)}$ tends to reach a constant value known as the sill (the dashed horizontal line, FIG. 7). For a variogram, the sill is the variance ($\sigma^2$) of the measured data. The distance at which the sill is reached by the variogram is called the range or correlation length. The sill and range are useful properties when comparing directional trends in the data. FIG. 7 illustrates a hypothetical anisotropic variogram showing a short scale correlation range of 800 meters and a long scale range of 2200 m.

Spatial continuity analysis is one of the most important steps in a geostatistical study, because it strongly influences the kriging and conditional simulation results, and associated uncertainties. Kriging and conditional simulation applications require knowledge of the variogram function for all-possible distances and azimuths. This requires a model of the experimental variogram in order to know the variance at any location, not just along specific inter-distance vectors corresponding to angular/distance classes.

To understand various aspects of the RF1 variogram, different experimental variograms are computed, including near range, long range anisotropic and long range omnidirectional. The near range variogram and long range variograms for RF demonstrate that RF data has an inherent trend of diminishing power as a function of distance. Data with an inherent trend is referred to as non-stationary and will tend not to flatten at the sill (variance=1.0), rather it continues to increase in variance with distance. Non-stationarity is expected because Path Loss (signal) decays in Free Space as approximately $20 \log_{10}[R]$, where R is the distance from the antenna. Correct variogram modeling requires removal of the trend to avoid biasing the interpolated values during geostatistical analysis of the data.

The practice of cross-validation is used to test the "goodness" of the spatial model and the search ellipse design. The procedure compares re-estimated values with measured values, just as one computes residuals between predicted and measured values in regression or analysis of variance.

After the variograms for the collected data are established, the data further manipulated through Kriging interpolation to determine the values for the missing data locations. Contouring data by hand or by computer uses some type of interpolation procedure. There are many algorithms used in computer mapping, all requiring some criterion to be satisfied. Inverse weighted distance is a commonly used mapping algorithm and its formulation is easily understood. The weights used in the interpolation process are based on how far each control point (measured value) is from the target location (bin center). Thus, control points closest to the target location receive higher weights. However, if the data exhibit strong anisotropy, it does not hold that the closest control point should receive the greatest weight, rather more distant control points need to have greater influence on the interpolated value.

Kriging is a geostatistical interpolation technique. It is a unique linear weighted-averaging method, similar to inverse weighted distance, but kriging weights depend upon the variogram model of spatial correlation.

Figure 8:
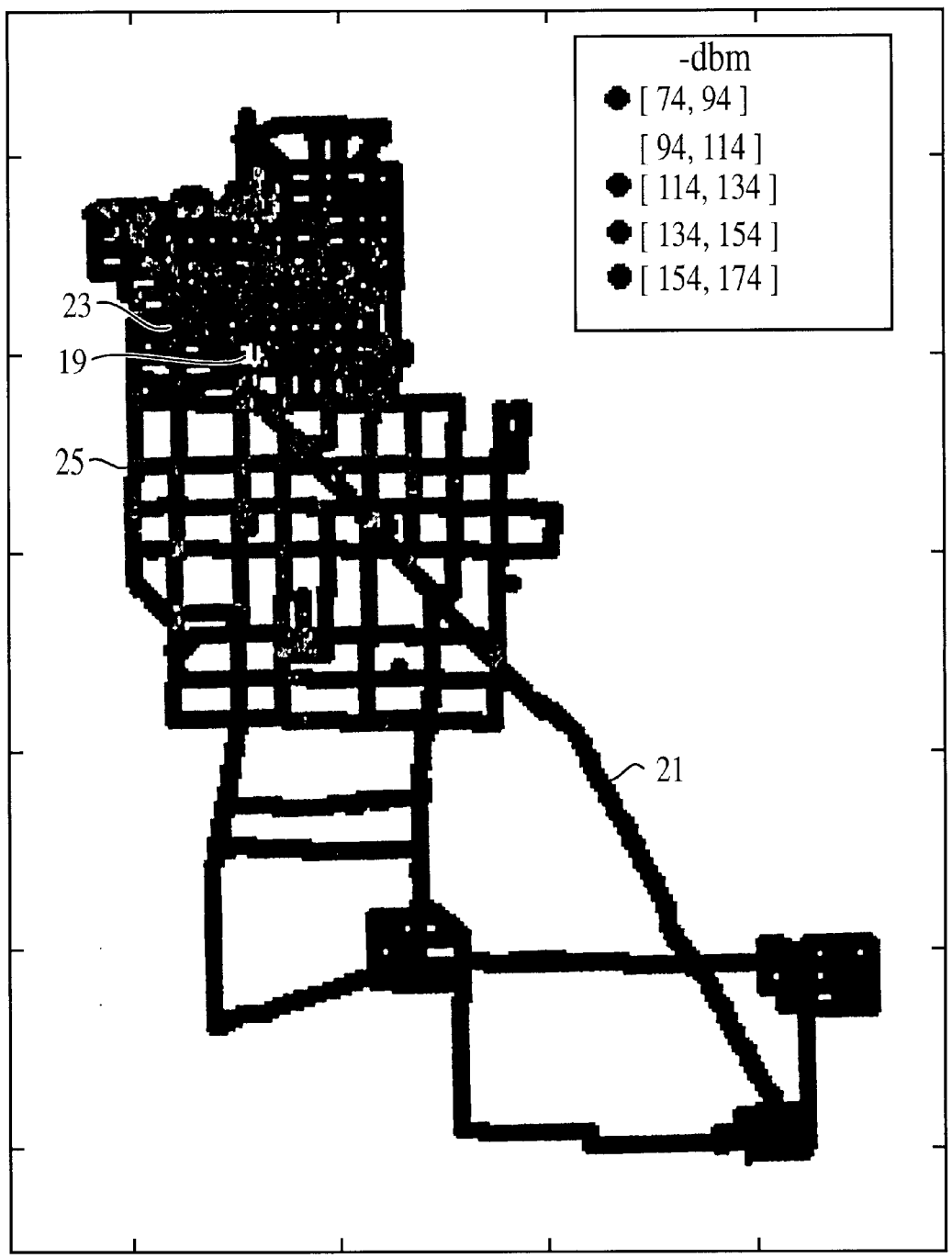
FIG. 8 is a diagram illustrating the filling in of missing data points using the geostatistical methods taught by the present invention.
Figure 9:
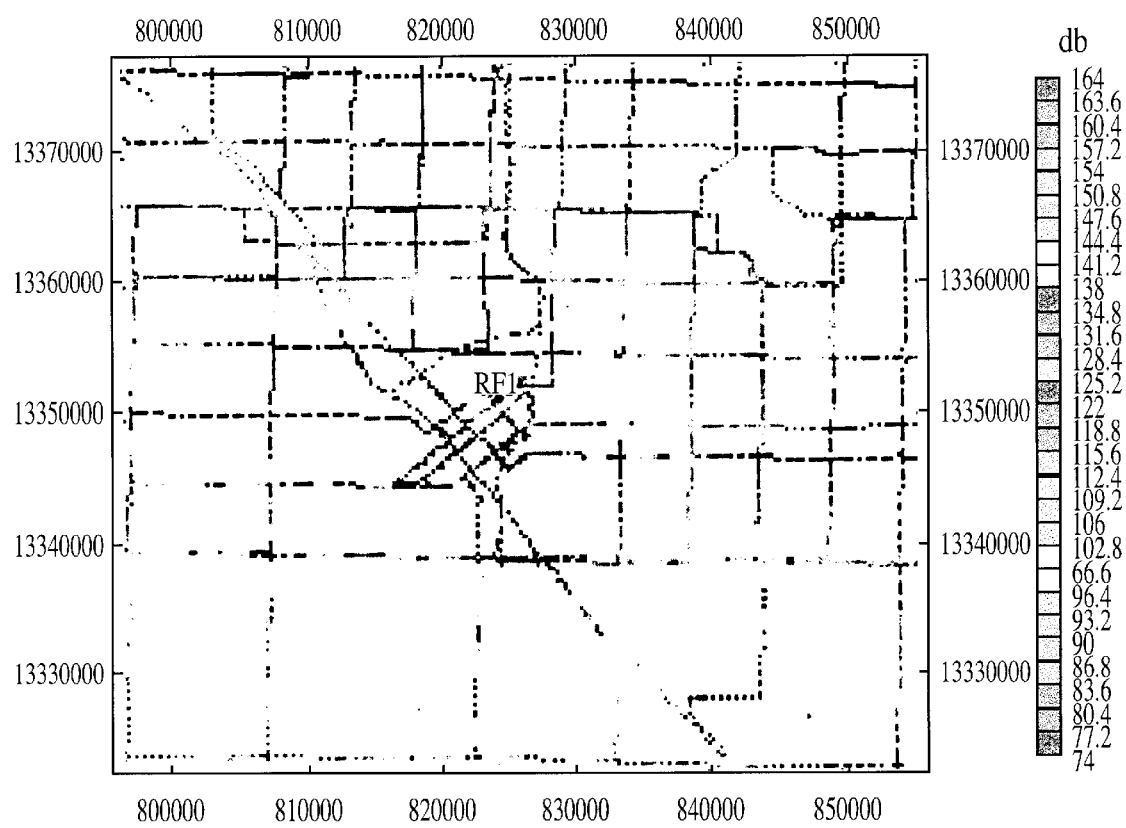
FIG. 9 is a diagram of the data of an exemplary drive test of after geostatistical interpretation.

FIG. 8 illustrates the kriging results for the data collected as illustrated in FIG. 5 at all bin locations. FIG. 9 illustrates the details of the downtown area in the vicinity of RF1 of FIG. 3.

Improvements in the application of geostatistical analysis techniques can be made by the use of Polar Coordinates to investigate trends and variogram development, the use of more complex data sets to investigate the effect of topography, water, and other physical factors. The use of co-kriging can be implemented to assist in the quantitization of minimum measurement error for improved approximation of unmeasured locations and to minimize the effects of drift and to determine optimum bin size.

Although the present invention has been described in terms of preferred embodiments, it will be appreciated that various modifications and alterations, might be made by those skilled in the art without departing from the spirit and scope of the invention. The above-described exemplary embodiments are therefore intended to be illustrative in all respects, rather than restrictive, of the present invention. Thus the present invention is capable of many variations in detailed implementation that can be derived from the description contained herein. All such variations and modifications are considered to be within the scope and spirit of the present invention as defined by the following claims.

What is claimed is:

1. A method for collecting and processing received signal level data over a wireless system, comprising the steps of:
    gathering an incomplete set of data of signal strength levels from closely spaced locations at which a mobile unit is likely to communicate with one or more base stations without disruption or modification of the normal operation of the wireless system;
    associating the elements of said gathered data with geographic locations corresponding to the location at which each data element was gathered;
    determining the signal strength of each element of said gathered data;
    identifying a digital identification code within said gathered data;
    normalizing said data to a set of bins defined by a grid applied to said wireless system;
    determining a variance relationship of said gathered data based upon the correspondence of signal strength variation to spacial separation of said data elements;
    recognizing the location of data elements missing from said complete set of locations within said wireless system;
    interpolating the probable signal strength values of said missing data elements from said gathered data, said corresponding geographical locations and said variance relationship.

2. The method of claim 1, whereon said identifying a digital identification code within said gathered data includes utilizing a rapid color code decoder to increase the probability of obtaining information under adverse conditions.

3. The method of claim 1, wherein said step of interpolating the probable values includes the use of secondary information to increase the accuracy of interpolated estimates.

4. The method of claim 1, further comprising the step of:
    recognizing a spatial trend in said gathered data, inherent in said wireless propagation; and
    compensating for said trend prior to determining said variance relationship of said gathered data.

5. The method of claim 4, wherein said inherent spatial trend is the path loss decay corresponding to an increase in the distance from said wireless source.

6. The method of claim 1, wherein said determined variance relationship is a variogram corresponding to said gathered data.

7. The method of claim 6, wherein said variogram is normalized for the inherent RF propagation trend of wireless signals.

8. The method of claim 1, wherein kriging is utilized to perform said interpolation.

9. The method of claim 1, further comprising the step of:
    producing a graphical representation of said gathered data and said probable missing data.

10. The method of claim 9, wherein said graphical representation includes projection of said signal strength values onto a map of said wireless system.

11. The method of claim 10, wherein said digital identification code is a Digital Verification Color Code used for TDMA digital transmission channel identification.

12. Apparatus for collecting and processing received signal level data over a wireless system, comprising:
    wireless receiving equipment for gathering an incomplete set of data of signal strength levels from closely spaced locations at which a mobile unit is likely to communicate with one or more base stations without disruption or modification of the normal operation of the wireless system;
    geographic location equipment connected to said wireless receiving equipment for associating the elements of said gathered data with geographic locations corresponding to the location at which each data element was gathered;
    signal strength measuring equipment for determining the signal strength of each element of said gathered data;
    digital decoding equipment for identifying a digital identification code within said gathered data;

a processor for normalizing said data to a set of bins defined by a grid applied to said wireless system; and for determining a variance relationship of said gathered data based upon the correspondence of signal strength variation to spacial separation of said data elements; and for recognizing the location of data elements missing from said complete set of locations within said wireless system; and for interpolating the probable signal strength values of said missing data elements from said gathered data, said corresponding geographical locations and said variance relationship.

13. The apparatus of claim 12, whereon said digital decoding equipment includes a rapid color code decoder to increase the probability of obtaining information under adverse conditions.

14. The apparatus of claim 12, wherein said interpolating the probable values includes the use of secondary information to increase the accuracy of interpolated estimates.

15. The apparatus of claim 12, wherein said processor also recognizes a spatial trend in said gathered data, inherent in said wireless propagation; and compensates for said trend prior to determining said variance relationship of said gathered data.

16. The apparatus of claim 15, wherein said inherent spatial trend is the path loss decay corresponding to an increase in the distance from said wireless source.

17. The apparatus of claim 12, wherein said determined variance relationship is a variogram corresponding to said gathered data.

18. The apparatus of claim 17, wherein said variogram is normalized for the inherent RF propagation trend of wireless signals.

19. The apparatus of claim 12, wherein kriging is utilized to perform said interpolation.

20. The apparatus of claim 12, further including:
   output means for producing a graphical representation of said gathered data and said probable missing data.

21. The apparatus of claim 20, wherein said graphical representation includes projection of said signal strength values onto a map of said wireless system.

22. The method of claim 12, wherein said digital identification code is a Digital Verification Color Code used for TDMA digital transmission channel identification.

* * * * *